Patented Dec. 22, 1942

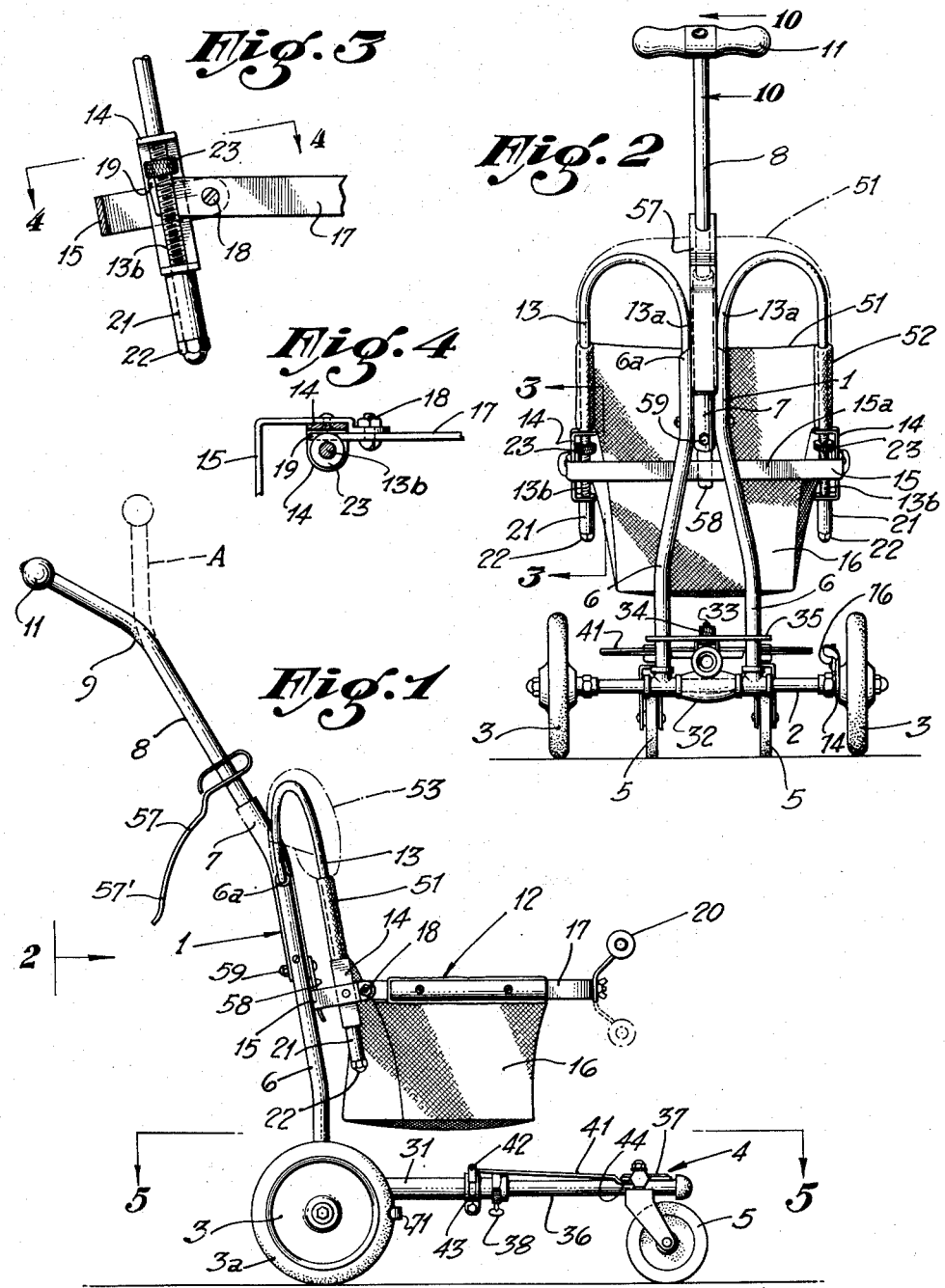

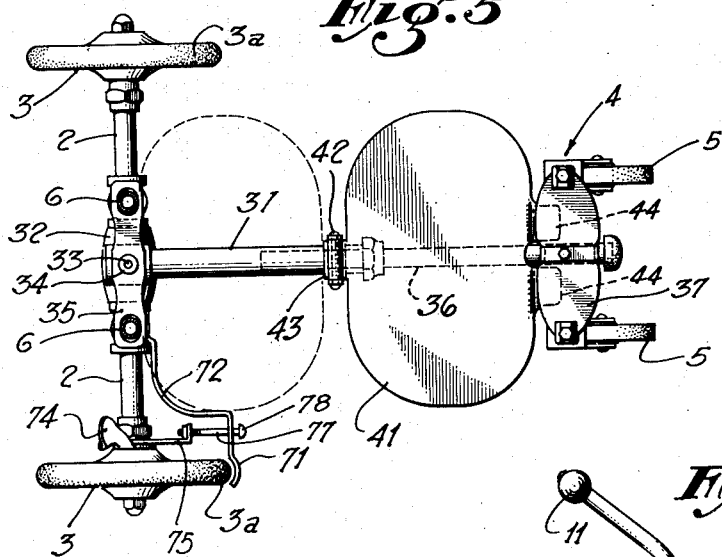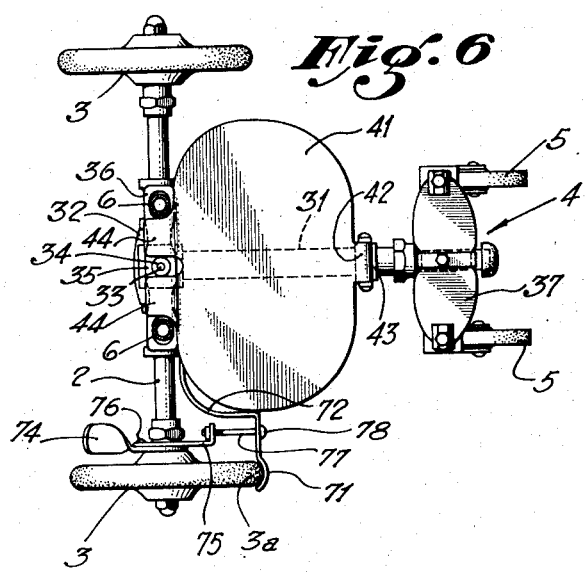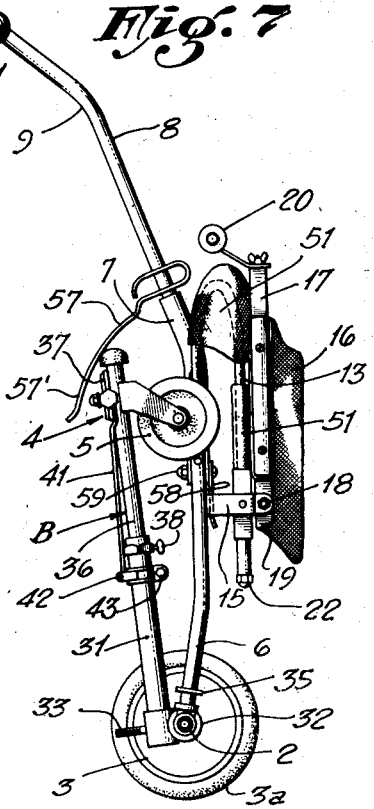

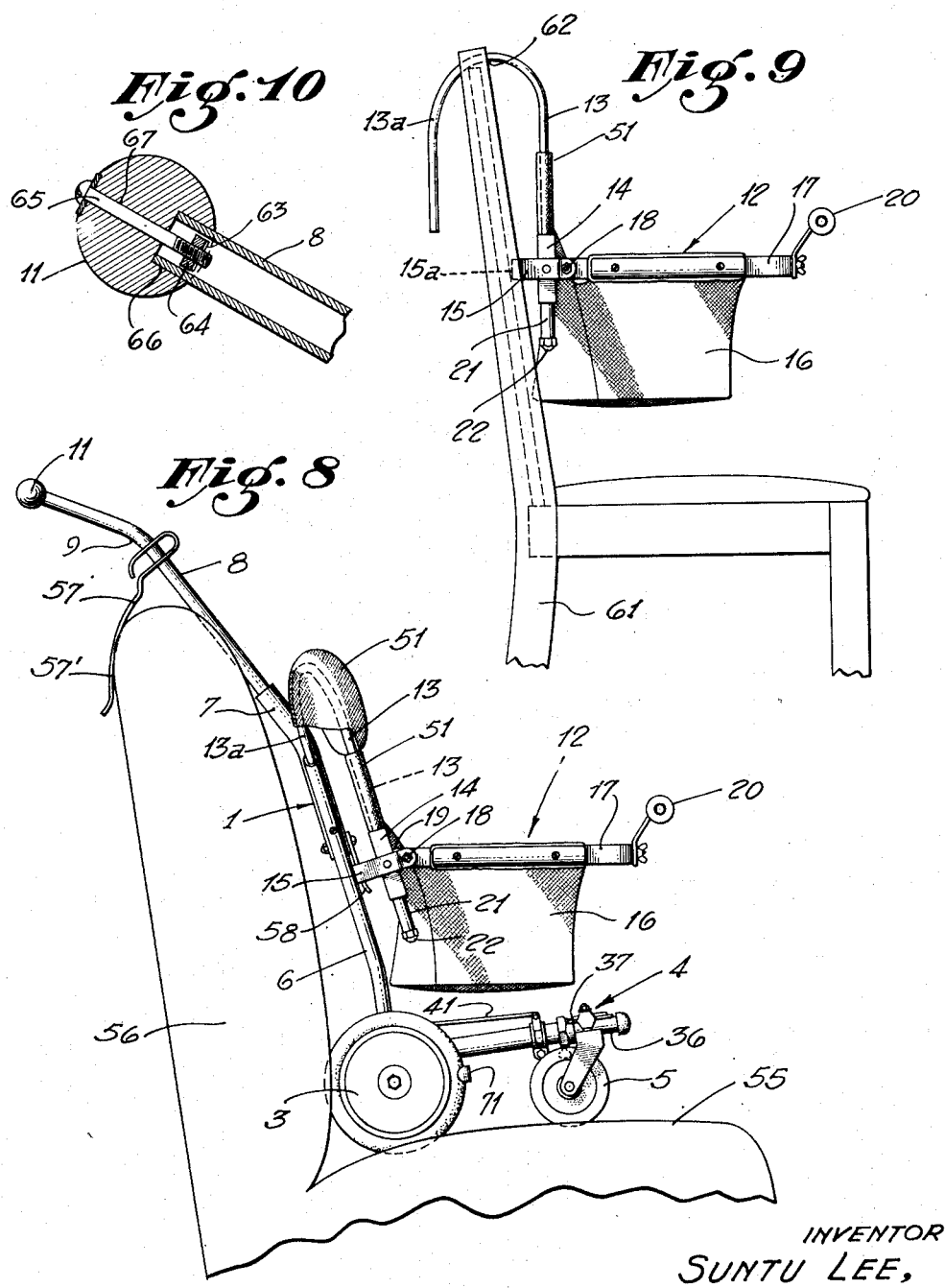

2,305,719

UNITED STATES PATENT OFFICE 2,305,719

BABY CART

Suntu Lee, Los Angeles, Calif.

Application April 18, 1941, Serial No. 389,245

5 Claims. (Cl. 280—41)

This invention relates to baby carts and the like and pertains particularly to a cart construction which is adapted also for use as a "walker." One of the particular objects of the invention is to provide a cart construction which may be folded into a compact condition for storage or the like. A further object of the invention is to provide a cart construction embodying a seat portion and a support or standard portion, in which the seat portion is adapted for angular adjustment with respect to the support portion whereby such seat portion may be established in a level or other desired position substantially independent of the angularity assumed by the support portion in any particular use.

A further object of the invention is to provide a combined baby walker and baby cart provided with a seat portion which may be removed from the support portion of the device and is adapted for mounting on any other convenient fixed support.

Other features and objects of the invention will be apparent from the ensuing description of a preferred embodiment thereof, as illustrated in the accompanying drawings and referring thereto:

Fig. 1 is a side elevation of a baby cart according to this invention, as it may be employed in actual use;

Fig. 2 is a rear elevation thereof;

Fig. 3 is a detail of the seat mounting adjustment, as taken on line 3—3 in Fig. 2;

Fig. 4 is a further detail of the structure shown in Fig. 3, as taken on line 4—4 therein;

Fig. 5 is a plan section of the lower portion of the structure, as taken on line 5—5 in Fig. 1, showing the forward support structure in extended position;

Fig. 6 is a view corresponding to Fig. 5, showing the forward support portion in retracted position;

Fig. 7 is a side elevation of the device in completely folded condition;

Fig. 8 illustrates the use of the cart construction in an automobile or the like wherein the entire cart is placed upon and is supported by the seat member of the automobile;

Fig. 9 illustrates the use of the removable seat portion of the device on the back of a conventional chair, in the provision of a so-called "highchair"; and Fig. 10 is a sectional detail illustrating a preferred form of attachment for the operating handle portion of the construction, as taken on line 10—10 in Fig. 2.

Referring to Figs. 1 to 6 of the drawings, the construction may comprise a standard or frame formed of a vertical standard 1 and a rigid transverse standard 2 carrying pivotally mounted wheels or the like 3, to which is attached a forward support portion 4 carrying a forward support wheel structure comprising one or more wheels or casters 5. The vertical standard may comprise two upwardly extending tubular members 6 secured at their lower ends to the transverse standard 2 and brought together at the upper ends and secured to a tubular center section 7. A tubular handle member may extend upwardly from the center section 7 as at 8, the handle member 8 being rotatably disposed within the tubular member 7 and bent over adjacent its upper end as at 9, terminating in a handle or gripping member 11. Suitable means, not shown, may be provided for fixing the rotative position of member 8 within the tubular member 7 so as to cause the same to adopt the position shown in full lines in Fig. 1, and alternatively the position shown in dotted lines at A in Fig. 1, which will effect an adjustment of the height of the gripping member 11 from the ground so as to more comfortably adapt the construction to use by a short or tall person.

The seat portion of the construction is illustrated generally at 12 and may comprise support arms 13 pivotally mounted on U shaped brackets 14 carried by a transverse yoke 15, the upper ends of the support arms 13 being bent inwardly and downwardly as at 13a and slidably disposed within the upper ends 6a of the tubular members 6. The seat proper may comprise a fabric member 16 of conventional shape secured to a forwardly extending arm-rest 17 pivotally mounted on the transverse yoke 15 as at 18, the ends of the arm-rest 17 being extended rearwardly, as at 19, past the pivot point 18 into position alongside the lower ends 13b of the support arms 13. The lower ends 13b of the support arms 13 are threaded, and may be threadedly mounted on the brackets 14. The lower projecting ends of the support arms may be furnished with an enclosing sleeve 21 and a nut 22, if desired. A coactingly threaded thumb-nut or the like 23 is mounted on the support arm portion 13b within the bracket 14 and as illustrated particularly in Figs. 3 and 4 is employed to engage the upper edge of the rearwardly projecting portion 19 of the arm-rest 17 to fix the angularity of such arm-rest with respect to the standard 1. Independent of the adjustment at a particular angularity, and as shown particularly in Fig. 7, the arm-rest and the associated seat member 16 may be raised upwardly about the pivot 18 to a folded position substantially in line with the support arms 13, to fold the device.

The forward support portion 4 may comprise a tubular member 31 pivotally mounted as at 32 on the transverse support structure 2 and removably secured in position with respect to the standard 1 in any suitable manner, as through the agency of a fixed pin 33 secured to the portion 31 and disposed in substantial transverse alinement with the lower ends of the standard members 6, said pin being threaded and being adapted for engagement by a coactingly threaded thumb-nut 34 rotatably mounted on an anchor bar 35 slidably disposed on the lower ends of the members 6, as shown more particularly in Fig. 2. In order to fold the forward support structure so as to cause the device to encompass a minimum space the thumb-nut 34 may be backed off to clear the pin 33, and the forward support structure 4 rotated rearwardly to a position such as indicated at B in Fig. 7.

Slidably mounted within the tubular member 31 I provide an extension bar 36 carrying at its forward end the forward support portion 4 and the wheels or casters 5, the latter of which may conveniently be mounted on a forward transverse support structure 37. A suitable set screw or the like 38 is provided for affixing the extension bar 36 and the structure associated therewith in any desired position of extension with respect to the tubular member 31. This forward support structure is shown in retracted position in Fig. 6 and in an extended position in Fig. 5. A suitable foot plate is provided on which the child may rest its feet when the device is used as a cart, and this foot plate is indicated at 41, pivotally secured to the tubular member 31 as at 42 through a bracket or the like 43 which may be fixedly mounted on the member 31. In order to fixedly place the foot plate 41 in extended position (Fig. 5) I may provide a forwardly extending tab or the like 44 at each side of the mid-line of the plate 41, and adapted to extend at opposite sides of the extension bar 36 and beneath the forward transverse support structure 37, said tabs being secured in position by loosening the screw 38, pulling the bar 36 forwardly to carry the member 37 past the position of the tabs 44, lowering the foot plate 41 into position, and then pushing the extension bar 36 inwardly to cause the member 37 to pass over the tabs 44, in which position it will function as a detent means, after which the screw 38 may be locked. The lateral dimensions of the tabs 44 may conveniently be made such as to pass between the members 6 and to clear the pin 33 when the foot plate 41 is folded into retracted position as shown in Fig. 6. In this retracted position, with the arm 31 and the forward support portion 4 extended to the full forward position, the device is useful as a "walker." The arm-rest portion 17 of the seat 12 is preferably made of U shape to completely enclose the forward portion of the seat area, and the child may stand erect within such enclosure, with his feet on the floor or ground, holding onto a conveniently disposed handle or the like 20. As may be visualized from Fig. 5, ample room for leg movement is provided when the plate is folded back into the dotted position.

The seat member is conveniently provided with a backing piece as indicated at 51, of fabric or the like, formed as a part of the fabric seat member 16, if desired, and stitched about the support arms 13 as at 52. Similarly, a head cushion may be provided as indicated in dot-dash lines at 53 in Figs. 1 and 2, and in full lines in Fig. 8, which may be slipped down over the upwardly directed portions of the upper ends 13a of the support arms and secured to the backing 51 in any suitable manner. This head cushion may be removed when the seat structure is removed from the standard as described hereinbelow.

Referring to Fig. 8, it will be seen that the device may be lifted into the front seat of an automobile, for example, the wheels 3 seated firmly at the juncture of the seat cushion 55 and the back portion 56, and the structure held in position through the agency of a spring clamp member 57 slidably mounted on the handle 8 and having a depending portion 57' adapted to engage the rearward edge of the back portion 56 of the seat. (This clamp member 57 may also be employed to hold the forward support portion in the position "B," Fig. 7, as shown therein.) When the device is used as in Fig. 8, the forward support portion 4 will be placed in fully retracted position, and owing to the fact that the angularity of the back portion 56 of the automobile seat will be somewhat different from the angularity of the standard 1 with respect to the horizontal, which would cause, in the case illustrated in Fig. 8, the arm-rest 17 to be inclined upwardly into an uncomfortable position for the occupant, I preferably adjust the thumb-nuts 23 upwardly to permit the arm-rest 17 to drop down to a more nearly horizontal position.

Where the seat member 12 is removed from the standard 1 for use as illustrated in Fig. 9, the thumb-nuts 23 may be screwed down on the support arm 13b so as to raise the arm-rest 17 to a generally horizontal position or to any other desired angularity. The seat 12 is readily removed from the standard 1 by loosening a pivotally mounted spring clamp 58 from engagement with the cross bar 15a of the transverse yoke 15, and pulling the support arm portions 13a out of the tubular standard portions 6. The spring clamp 58 may be mounted upon the center section 7 through the agency of a bolt 59. The portions 13a of the support arms may then be hooked over the back of a chair or the like 61, as at 62. It will be appreciated that a rubber covering or the like, not shown, may be provided for the portions of the support arms which would engage the chair back, if desired, to avoid unduly marring the surface of the chair back. Furthermore, the two free ends 13a of the support arms may be forced toward one another through the agency of a strong rubber band, or the like, into a position corresponding to that adopted by the arms when installed upon the frame (see Fig. 2, for example) which would make the seat somewhat more stable in its mounting on a chair back.

The grip portion 11 of the handle 8 may be attached to the handle in any convenient manner, although I prefer to provide a transversely extending rectangular opening 63 at the upper end of the tubular handle 8 through which an elongated bar 64 may be passed, said bar being of a length slightly in excess of the diameter of such handle 8, to which a holding screw 65 is threadedly secured. The grip member 11 may be recessed as at 66 to receive the upper end of the handle 8, and the screw 65 may pass through a diametrical bore 67 in said grip member.

As shown more particularly in Figs. 2, 5 and 6, I prefer also to provide a brake member adapted to engage one of the wheels 3 so that the cart may be locked in position, and this brake may comprise a brake shoe 71 secured to or forming a part of a spring arm 72 secured to the transverse standard 2 at a position inwardly removed from a wheel 3. In order to pull the brake shoe 71 into engagement with the tire 3a of the wheel 3, I may provide an operating lever 74 pivotally mounted on the tubular standard 2 and carrying a link 75 pivotally mounted thereon as at 76, said link being adapted to engage the rearward end of a bolt 77 upon rearward downward movement of the lever 74 and pull the associated bolt head 78 into engagement with the spring arm 72 to cause the brake shoe to be pulled against the tire rim. The bolt 77 is conveniently passed through a corresponding opening in the spring arm 72.

The above-described embodiment will be understood to be illustrative only and I do not consider my invention limited thereto, but rather to the scope of the subjoined claims.

I claim:

1. In a baby cart, the structure which comprises: an upwardly extending frame standard having a handle portion at its upper end and including a rigid transverse support member at its lower end provided with two transversely spaced main support wheels; a forward support portion secured to said frame standard adjacent the lower end thereof and extending forwardly therefrom; an extension arm slidably mounted on said forward support portion and adapted for sliding movement in the direction of extension of said forward support portion; a forward support wheel structure mounted on the forward end of said extension arm; and locking means carried on said forward support portion and adapted for engagement with said extension arm to fix the position of said extension arm and the forward support wheel structure carried thereby with respect to the position of said transversely spaced main support wheels.

2. A construction as set forth in claim 1, said forward support portion being pivotally mounted to said frame standard for rotation about a transversely extending axis between a normal and a folded position, and locking means for holding said forward support structure in such normal position.

3. A baby cart which comprises: an upwardly extending frame standard having a handle portion at its upper end and including a rigid transverse support member at its lower end provided with two transversely spaced main support wheels; a seat structure secured to said frame standard at a position above said transverse support member and extending forwardly thereof to define a forwardly directed seating space; a forward support member secured to said frame standard at a position substantially equidistant between said spaced support wheels and extending forwardly from said standard at a position below said seat member, said forward support member being rigidly mounted on said transverse support member against movement with respect thereto in a plane parallel to the length of said transverse support member; an elongated extension arm slidably disposed on said forward support member for sliding longitudinal movement in the direction of extension thereof, whereby said extension arm is caused to be medially disposed with respect to said two transversely spaced main support wheels, and a forward support wheel structure mounted on the forward end of said extension arm.

4. The structure set forth in claim 3, and comprising in addition a foot-plate member pivotally secured to said forward support member at the forward end thereof and movable between a retracted position in which it is located substantially wholly rearwardly of its point of pivotal attachment and an extended position in which it is located substantially wholly forwardly of said point and substantially wholly forward of said seat structure, to define a substantially flat foot-rest area below the forward position of said seat structure.

5. The structure set forth in claim 3, and comprising in addition a foot-plate member pivotally secured to said forward support member at the forward end thereof and movable between a retracted position in which it is located substantially wholly rearwardly of its point of pivotal attachment and an extended position in which it is located substantially wholly forwardly of said point to define a substantially flat foot-rest area below the forward position of said seat structure, and detent means at the forward end of said extension arm adapted to engage the forward edge portion of said foot-plate member to fix said member in said extended position.

SUNTU LEE.